United States Patent

Kawada

[11] 4,341,366
[45] Jul. 27, 1982

[54] FISHING REEL CLUTCH

[75] Inventor: Minoru Kawada, Iruma, Japan

[73] Assignee: Olympic Fishing Tackles Co., Ltd., Saitama, Japan

[21] Appl. No.: 165,337

[22] Filed: Jul. 2, 1980

[30] Foreign Application Priority Data

Jul. 6, 1979 [JP] Japan .............................. 54-93816[U]

[51] Int. Cl.³ .............................................. A01K 89/00
[52] U.S. Cl. ................................ 242/220; 192/70.22; 192/70.27
[58] Field of Search ............... 342/220, 221, 218, 219, 342/214, 212, 213; 192/70.22, 70.27, 67 R

[56] References Cited

U.S. PATENT DOCUMENTS

| | | | |
|---|---|---|---|
| 1,974,333 | 9/1934 | Hirsch | 242/220 |
| 2,652,991 | 9/1953 | Murvall | 242/220 |
| 4,142,694 | 3/1979 | Rankin, Jr. | 242/220 |
| 4,168,812 | 9/1979 | Karlson | 242/220 |

Primary Examiner—Billy S. Taylor
Attorney, Agent, or Firm—Birch, Stewart, Kolasch & Birch

[57] ABSTRACT

A fishing reel comprising a housing including frame members. A spool member is provided containing a spool shaft supported between the frame members. A pinion gear member is slidably mounted on and movably engageable with the spool shaft. A main gear member is rotatably disposed within the housing, the main gear member is connected to a handle shaft member and is rotatable therewith. The main gear member is operably engaged with the pinion gear, and a clutch mechanism is mounted on the frame members and is operably connected to the pinion gear for movably engaging the pinion gear on the spool shaft, whereby the spool member is placed under load by either manually reciprocating the clutch mechanism to enable the pinion gear to engage with the main gear or by turning the handle to automatically enable the pinion gear to engage with the main gear.

11 Claims, 7 Drawing Figures

FISHING REEL CLUTCH

BACKGROUND AND SUMMARY OF THE INVENTION

The present invention relates to a fishing reel, and more particularly to the clutch mechanism of a center shaft type reel.

Previously, in the clutch of a center shaft type reel, the power transmission is disconnected by pressing or turning the clutch lever to release the spool and to cast. The clutch is then connected by turning the handle to wind the fishing line onto the spool after casting.

Accordingly, a fishing rod is held in the right hand, and when the clutch has been disconnected and the fishing line is cast and if a fish takes the hook simultaneously with splashing of the lure into the water the fishing rod must be passed from the right hand to the left hand, the handle provided on the right side of the reel must be turned with the right hand to engage the clutch, and the fishing line is then wound.

Thus in the above mentioned case, the spool is free of braking power until the fishing rod is passed from the right hand to the left hand and the handle is turned to engage the clutch with the right handle. Therefore, if a fish takes the hook simultaneously with the splashing of the lure into the water and a tension is exerted on the fishing line, said fishing line is in a released position to be drawn from the spool without any load, and the fishing line tends to cause a coiling phenomenon which is an inconvenient and undesirable fishing situation.

According to the present invention the clutch is engaged with the left hand, while holding the fishing rod in the right hand, thus, when the above-mentioned situation occurs after casting the above-mentioned disadvantages can be avoided. The fishing reel of the present invention comprises a pinion gear mounted slidably on a spool shaft of a spool supported transversely on right and left side frames. The spool is engaged with a main gear and is rotatable together with a handle. The pinion gear is movably engaged on the spool shaft and is engaged and disengaged by the pressing of a clutch lever mounted on the frame. A locking pawl is provided for preventing the return of the clutch lever on the one frame. Clutch switching plates forming engaging pawls are provided which engage with a clutch switching pin mounted on a rotating disk rotatable together with a handle shaft and are swingably mounted on a second frame. The locking pawls of said switching plates being engaged with the top of the clutch returning lever mounted pressing-movably on the frame, thereby the clutch is able to be returned by both pressing the clutch returning lever or by turning the handle.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
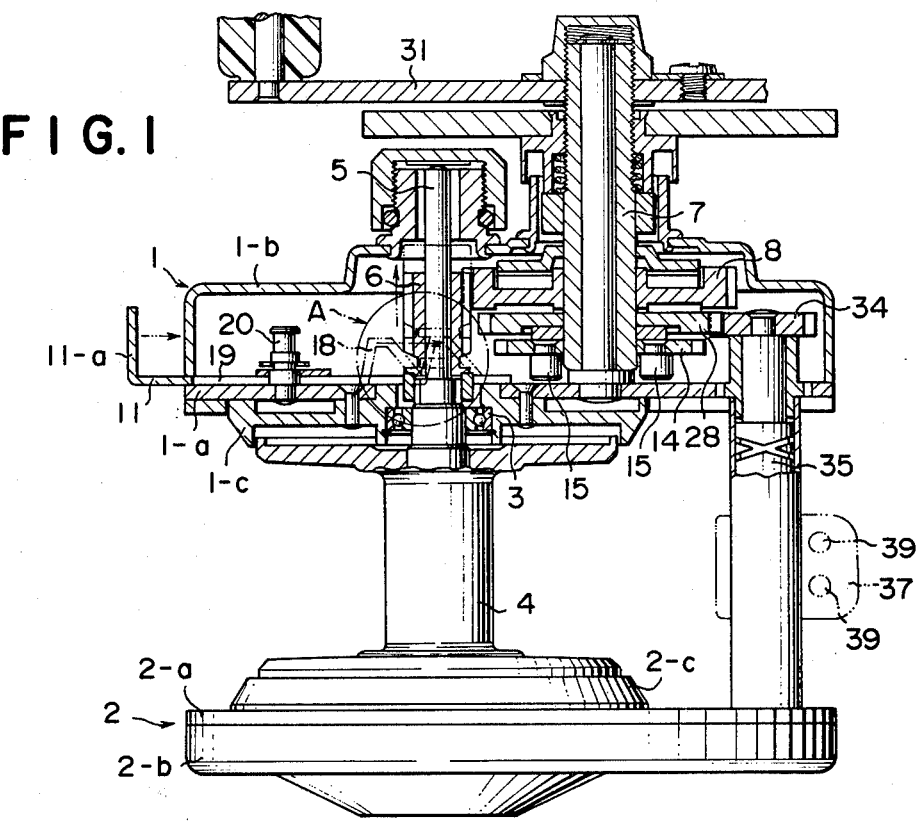
FIG. 1 is a partial cutaway elevational view in which the clutch is engaged.

The present invention will be clearly understood with reference to the following drawings wherein elements 1 and 2 are right and left side frames constituting the reel body. The side frames 1 and 2 are formed as hollow elements by side plates 1-a and 2-a, side plate covers 1-b and 2-b, and spool rings 1-c and 2-c, respectively. A spool shaft 5 of the spool 4 is supported on bearings 3 mounted on the right and left spool rings 1-c, 2-c across the body. A power transmission mechanism and clutch mechanism for rotation of the spool are contained on one of said side frames 1.

A pinion gear 6 is slidably mounted along the axial direction on the spool shaft 5 in the side frame 1. The pinion gear 6 is engaged with the main gear 8 which is rotatable together with the handle shaft 7 mounted rotatably on the side plate 1-a. The pinion gear is movably engaged with the spool shaft 5 and the rotation of the handle is transmitted through the main gear 8 and the pinion gear 6 to the spool 4 when the pinion gear 6 is engaged with the spool shaft 5. Thus, the spool 4 is free to rotate when the pinion gear 6 is disengaged from the spool shaft 5.

The mechanism by which the pinion gear 6 is movably engaged with the spool shaft 5, i.e. the clutch mechanism, is composed of a receiving plate 10 engaged in a ring groove 9 provided on the circumferential surface of the pinion gear 6, a clutch lever 11 for moving the receiving plate 10 up and down, a clutch switching plate 12 for preventing the clutch lever 11 from returning, a clutch returning lever 13 for disengaging the clutch swinging plates 12 from the clutch lever 11, and a rotation disk 14 having a clutch swinging pin 15.

The clutch mechanism is described in more detail as follows. The receiving plate 10 is solidly supporting the pinion gear 6 and is movably engaged up and down with a supporting rod 16 provided to extend from the side plate 1-a to the side plate cover 1-b. Coil springs 17 are provided between the upper surface of the receiving plate 10 and the side plate cover 1-b, pressing continuously the receiving plate 10 downward, i.e. in the direction to engage the pinion gear 6 with the spool shaft 5.

The clutch lever 11 is forked into two branches at the opposite end from the handle part 11-a. Projections 18 are solidly provided on the branches 11-b. A guide groove 19 is provided between the branches. The groove 19 engages a guide rod 20 fixed vertically on the side plate 1-a. A tension spring 22 is stretched between the clutch lever 11 and a projection 21 on the side plate 1-a. Accordingly, the projections 18 of the branches 11-b of the clutch lever 11 are forced to separate from the receiving plate 10 by the tension in the tension spring 22, and then the projections 18 on the branches 11-b lift the receiving plate 10 upward. Correspondingly the pinion gear 6 is released from engagement with the spool shaft 5, and the spool 4 is released to rotate freely by pressing the handling part 11-a of the clutch lever 11 against the tension of the tension spring 22.

A stop pin 23 is fixed on the clutch lever 11. The clutch switching plates 12 are movably engaged with the stop pin 23 and are swingably supported on the side plate 1-a on a shaft 24.

Locking pawls 12-a are movably engage with the stop pin 23 of the clutch lever 11 on one side of the clutch switching plates 12 and engaging pawls 12-b engage with the clutch switching pin 15 mounted on the rotating disk 14, rotating together with the handle shaft 7 on the other side of the clutch switching plates 12. The thus formed two clutch plates are supported side by side on the side plate 1-a. One of the engaging pawls 12-b of the two switching plates 12 is extended and the engaging pawls are so constructed as to nip the clutch switching pins 15 with both long and short engaging pawls.

A tension spring 25 between the locking pawl 12-a of the upper clutch switching plate 12 and the guide rod 20, and a tension spring 27 between the middle of the under clutch switching plate 12 and the projection 26 on the side plate 1-a are stretched, whereby both the upper and under clutch switching plates 12 are continuously forced in a direction so as to engage with the stop pin 23 of the clutch lever 11 and the clutch switching pin 15 of the rotating disk 14.

A nonreturn gear mechanism rotating together with the handle shaft 7 includes an intermediate gear 28 which is mounted adjacent to a rotating disk 14 on which the clutch switching pins 15 are mounted.

In the drawings, a nonreturn pawl 30, a handle 31 and a nonreturn lever 32 are adapted to force the disengagement of the nonreturn pawl 30 from the rotating disk 14. A fishing line parallel winding mechanism 35 is provided by which the fishing line is traversed from left to right within the left and right side frames to wind it evenly on the circumferential surface of the spool.

The fishing line parallel winding mechanism 33 is composed of a rotating, parallel winding gear 34 engaged with the intermediate gear 28, a double grooved shaft 35 mounted on the parallel winding gear 34, a slide 37 having a sliding part 36 engaged with the double grooved shaft 35, and two line guides 39 fixed to the slide 37 at one end thereof and slidably engaged with the guide rod 38 placed between the side frames at the other end thereof. Thus, the slide 37 reciprocates in the left and right directions so as to wind the fishing line evenly on the spool by the rotation of the double grooved shaft 35 caused by operating the handle 31.

Figure 2:
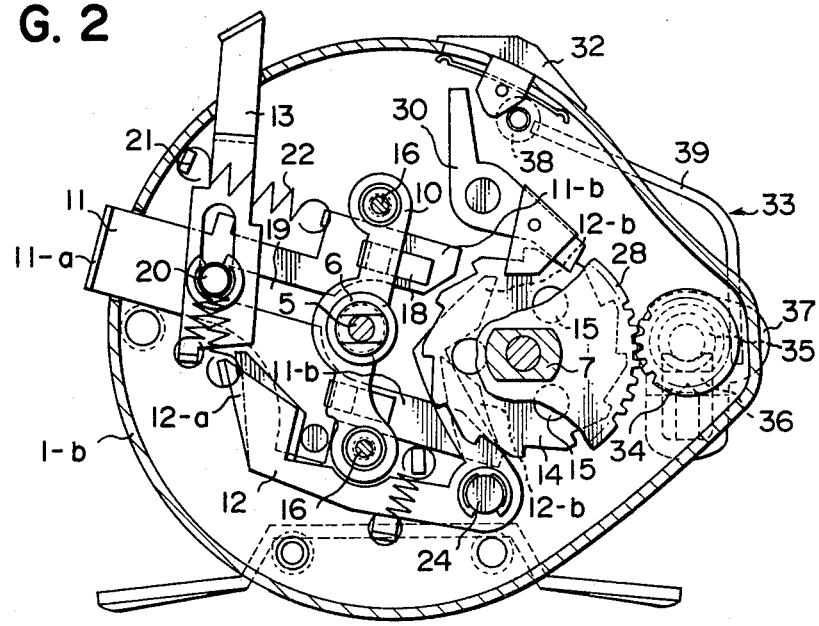
FIG. 2 is a partial cutaway plan view in which the clutch lever is pressed.

In the above-mentioned mechanism, there are two ways to return to the original engaged state from the disengaged state in which the pinion gear 6 is disengaged from the spool shaft 5 which occurs by pressing the handle part 11-a of the clutch lever 11 as illustrated in FIG. 2.

Figure 3:
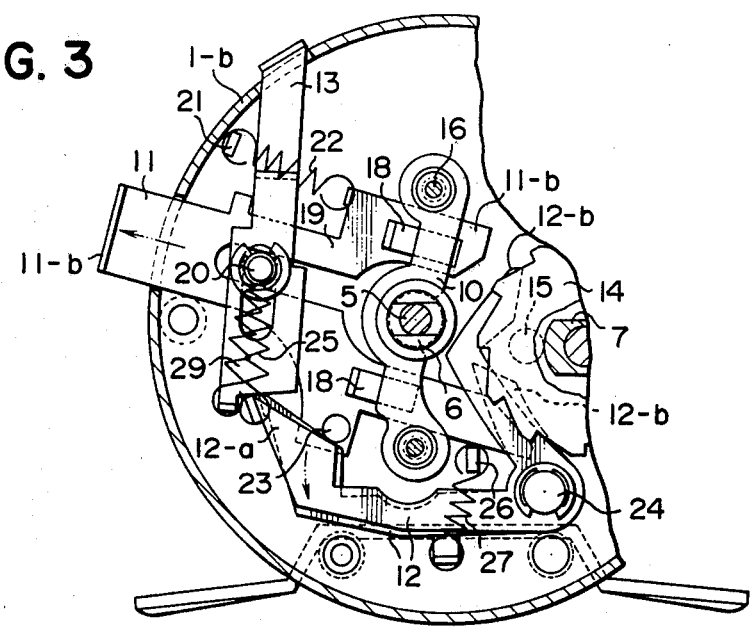
FIG. 3 is a partial cutaway plan view in which the clutch returning lever is pressed to connect the clutch.

One way is to press the clutch returning lever 13, in which the top of the lever 13 presses down the locking pawls 12-a of the two clutch switching plates 12 to disengage the stop pin 23 of the clutch lever 11 from the locking pawls 12-a of the clutch switching plates 12. When, the clutch lever 11 returns to its original position by the tension of the tension spring 22 forcing the lever 11 in the disengaging direction, correspondingly, the projections 18 of the clutch lever 11 are lifted from the receiving plate 10 supporting the pinion gear 6 and are separated in the backward direction. In addition, the receiving plate 10 is pressed off in the downward direction by the elastic force of the coil springs 17, and the pinion gear 6 is engaged with the spool shaft 5 to result in a condition in which the spool 4 is rotated through the rotation of the handle (see FIG. 3).

Figure 4:
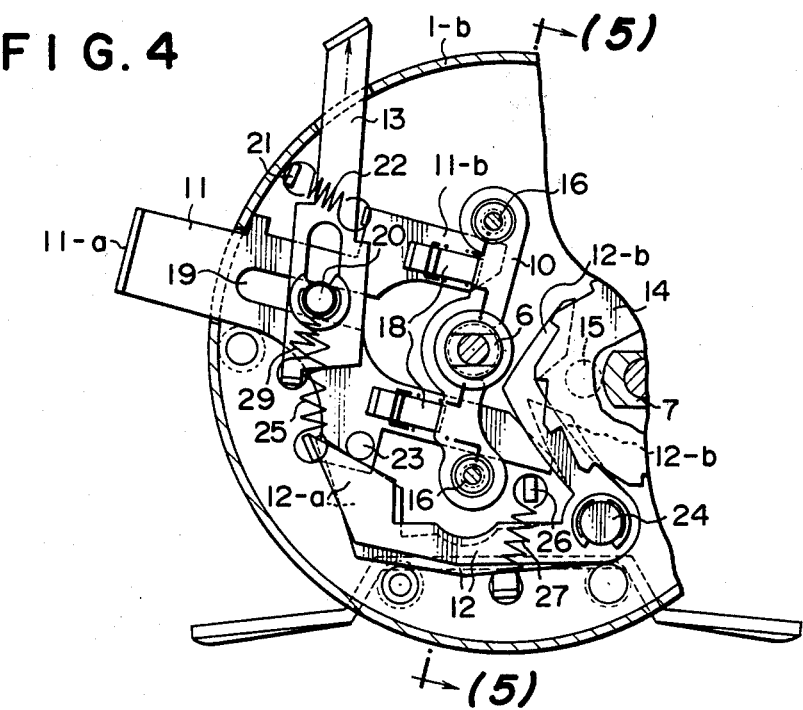
FIG. 4 is a partial cutaway plan view in which the clutch lever and the clutch returning lever are returned to the original position.
Figure 5:
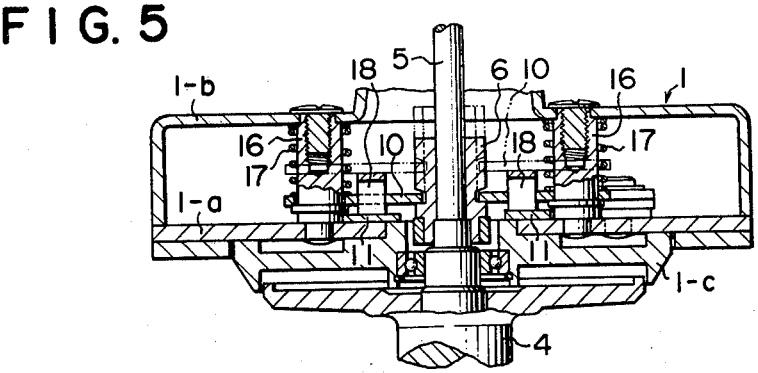
FIG. 5 is a sectional view taken along line (5)—(5) of FIG. 4.
Figure 6:
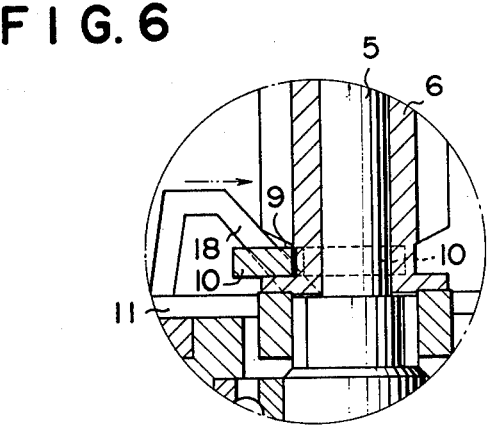
FIGS. 6 and 7 are enlarged views of part A in FIG. 1 where in FIG. 6 the clutch is connected and in FIG. 7 the clutch is disconnected.
Figure 7:
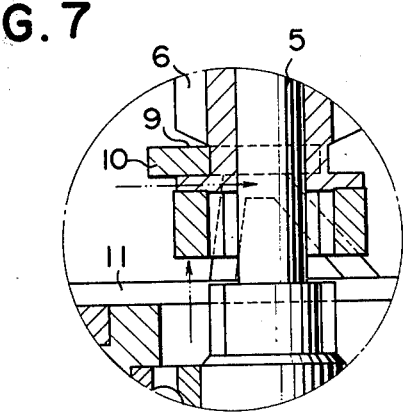

When the clutch returning lever 13 is released from pressing, it is returned to its original position by the tension of the tension spring 29 (see FIG. 4).

The above-mentioned operation is a clutch returning method using the clutch returning lever 13. However, in another method of operation, the handle is operated as has been done conventionally, that is, when the handle is turned the rotating disk 14 the clutch switching plates 12, which are mounted adjacent thereto, are rotated, thereby the clutch switching pins 15 push the engaging pawls 12-b of the clutch switching plates 12 outwardly. The clutch switching plates 12 rotate around the shaft 24 and swing around the shaft 23. The locking pawls 12-a of the clutch switching plates 12, positioned adjacent to the stop pin 23 of the clutch lever 11 are separated therefrom, and the clutch lever 11 is returned to its original position. Then, according to the same mechanism as mentioned above, the pinion gear 6 and the spool shaft 5 are engaged together, and the spool 4 can be rotated by the rotation of the handle.

Due to the above-mentioned constitution of the present invention, the clutch can be returned not only by a conventional rotating operation of the handle but also by a pressing operation of the clutch returning lever mounted on the side frame.

Accordingly, when a fishing line is cast holding the fishing rod with the right hand and a fish takes the hook simultaneously with splashing of the lure, by operating the clutch returning lever with the left hand a clutch engagement takes place instantaneously to exert a braking force on the rotation of the spool. Thus, the fishing line will not be drawn out under a no load condition and damage to the fishing line can be completely prevented. The clutch can be returned not only by pressing the lever but also by a rotating operation of the handle as conventionally used. The appropriate operation can be selected depending upon the particular fishing situation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fishing reel comprising, a housing including side frame members;

spool means including a spool shaft supported between said side frame members;

pinion gear means being slidably mounted on said spool shaft for selectively rotating together with said spool shaft in a first position and being disengaged from rotating together with said spool shaft in a second position;

a main gear means rotatably disposed within said housing, said main gear means being operatively connected to a handle shaft means for rotation therewith and said main gear means being operably engaged with said pinion gear means;

a clutch lever means operatively mounted within said housing and operably connected to the pinion gear means for movably positioning the pinion gear means on the spool shaft to assume said second position;

rotating disk means being operatively connected to said handle shaft means for rotation therewith, said rotating disk means including at least one clutch switch pin mounted thereon;

clutch switch plate means being operatively mounted within said housing and being in releasable locking engagement with said clutch lever means for selectively preventing said clutch lever means from returning to a normal position wherein said clutch lever means is disengaged from said pinion gear means; and clutch returning lever means being operatively mounted within said housing and being manually engageable with said clutch switch plate means to release said clutch switch plate means from locking engagement with said clutch lever means to permit said pinion gear means to assume said first position on said spool shaft;

said at least one clutch switch pin being mounted for engagement with said clutch switch plate means to automatically release said clutch switch plate means from locking engagement with said clutch lever means upon rotation of said rotating disk means.

2. A fishing reel according to claim 1, wherein said clutch lever means includes a receiving plate being in engagement with said pinion gear means for selectively shifting said pinion gear means to assume said second position.

3. A fishing reel according to claim 2, wherein said receiving plate is normally spring biased to dispose said pinion gear means to assume said first position.

4. A fishing reel according to claim 1, wherein said clutch switch plate means includes locking pawls for engagement with said clutch lever means and said clutch switch pin.

5. A fishing reel according to claim 4, wherein said locking pawls project outwardly and said clutch switch plate means is pivotally mounted to said housing.

6. A fishing reel according to claim 1, wherein said rotating disk means includes three clutch switch pins mounted thereon.

7. A fishing reel according to claim 1, wherein said clutch lever means is spring biased to normally assume a position out of engagement with said pinion gear means.

8. A fishing reel according to claim 1, wherein said clutch lever means includes a stop pin for positioning said clutch switch plate means to be out of locking engagement with said clutch lever means when said clutch switch plate means is engaged by said clutch returning lever means or said clutch switch pin.

9. A fishing reel according to claim 1, wherein said clutch switch plate means is spring biased to assume a position in releasable locking engagement with said clutch lever means.

10. A fishing reel according to claim 1, wherein said clutch lever means includes projections extending therefrom and a receiving plate in engagement with said pinion gear means, said projections being normally out of engagement with the receiving plate and being selectively movable into engagement with said receiving plate to move said pinion gear along the spool shaft to assume said second position.

11. A fishing reel according to claim 1, and further including an intermediate gear rotatably positioned on said handle shaft means and being operatively connected to a winding gear affixed to a double grooved shaft, a slide being operatively connected to said double grooved shaft and being movable between said side frame members to evenly distribute a fishing line onto said spool as the handle shaft means is rotated.

* * * * *